US009174629B2

(12) United States Patent
Asami et al.

(10) Patent No.: US 9,174,629 B2
(45) Date of Patent: Nov. 3, 2015

(54) VEHICLE

(71) Applicants: Takayuki Asami, Toyota (JP); Masashi Yoshimi, Toyota (JP)

(72) Inventors: Takayuki Asami, Toyota (JP); Masashi Yoshimi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/231,922

(22) Filed: Apr. 1, 2014

(65) Prior Publication Data

US 2014/0297081 A1    Oct. 2, 2014

(30) Foreign Application Priority Data

Apr. 2, 2013 (JP) .................................. 2013-076631

(51) Int. Cl.

| | |
|---|---|
| *B60W 50/00* | (2006.01) |
| *B60W 10/08* | (2006.01) |
| *B60L 3/00* | (2006.01) |
| *B60W 10/30* | (2006.01) |
| *B60W 10/06* | (2006.01) |
| *B60L 1/00* | (2006.01) |
| *B60L 11/12* | (2006.01) |
| *B60L 11/14* | (2006.01) |
| *B60L 11/18* | (2006.01) |
| *B60W 50/038* | (2012.01) |
| *B60K 11/08* | (2006.01) |
| *B60W 30/184* | (2012.01) |
| *B60W 20/00* | (2006.01) |
| *B60W 50/029* | (2012.01) |

(52) U.S. Cl.

CPC .............. *B60W 10/08* (2013.01); *B60K 11/085* (2013.01); *B60L 1/003* (2013.01); *B60L 3/0061* (2013.01); *B60L 11/126* (2013.01); *B60L 11/14* (2013.01); *B60L 11/1881* (2013.01); *B60W 10/06* (2013.01); *B60W 10/30* (2013.01); *B60W 20/50* (2013.01); *B60W 30/1843* (2013.01); *B60W 50/038* (2013.01); *B60L 2240/36* (2013.01); *B60L 2240/425* (2013.01); *B60L 2240/441* (2013.01); *B60L 2240/443* (2013.01); *B60L 2240/445* (2013.01); *B60L 2240/525* (2013.01); *B60L 2260/26* (2013.01); *B60W 2050/0295* (2013.01); *B60W 2510/0676* (2013.01); *B60W 2510/087* (2013.01); *B60W 2710/0644* (2013.01); *B60W 2710/0666* (2013.01); *Y02T 10/6217* (2013.01); *Y02T 10/642* (2013.01); *Y02T 10/7077* (2013.01); *Y02T 90/34* (2013.01)

(58) Field of Classification Search

None
See application file for complete search history.

(56) References Cited

U.S. PATENT DOCUMENTS

| | | | |
|---|---|---|---|
| 6,450,275 B1 | 9/2002 | Gabriel et al. | |
| 6,588,380 B2 * | 7/2003 | Ries-Mueller | 123/41.05 |
| 8,439,276 B2 * | 5/2013 | Prior | 236/35.2 |

(Continued)

FOREIGN PATENT DOCUMENTS

| | | |
|---|---|---|
| JP | 05-058172 A | 3/1993 |
| JP | 2000-142126 A | 5/2000 |

(Continued)

*Primary Examiner* — Jonathan M Dager
(74) *Attorney, Agent, or Firm* — Dinsmore & Shohl LLP (57) ABSTRACT

A vehicle includes a driving source, a shutter device, and a controller. The driving source is configured to generate a driving force. The shutter device is configured to adjust an amount of air for cooling the driving source. The controller is configured to control the driving source and is configured to restrict an operation of the driving source based on a temperature of the driving source when a failure of the shutter device is detected.

12 Claims, 8 Drawing Sheets

(56) References Cited

U.S. PATENT DOCUMENTS

| | | |
|---|---|---|
| 2003/0101947 A1 | 6/2003 | Ries-Mueller |
| 2004/0238246 A1* | 12/2004 | Ceccarani et al. ............ 180/68.1 |
| 2006/0095178 A1* | 5/2006 | Guilfoyle et al. ............... 701/36 |
| 2006/0102399 A1* | 5/2006 | Guilfoyle et al. ............ 180/68.1 |
| 2011/0005851 A1* | 1/2011 | Doroghazi et al. ........... 180/68.1 |
| 2011/0118945 A1* | 5/2011 | Mochizukil ..................... 701/49 |
| 2011/0137530 A1* | 6/2011 | Kerns ............................. 701/49 |
| 2011/0246023 A1* | 10/2011 | Lockwood et al. .............. 701/36 |
| 2012/0074729 A1* | 3/2012 | Fenchak et al. ............. 296/193.1 |
| 2012/0318476 A1* | 12/2012 | Begleiter et al. ................. 165/51 |
| 2013/0046445 A1* | 2/2013 | Nishimura et al. .............. 701/49 |
| 2013/0095740 A1* | 4/2013 | Hori ............................... 454/152 |
| 2013/0184943 A1* | 7/2013 | Sato et al. ........................ 701/49 |
| 2013/0223980 A1* | 8/2013 | Pastrick et al. ..................... 415/1 |
| 2013/0247862 A1* | 9/2013 | Sakai .......................... 123/188.1 |
| 2013/0248266 A1* | 9/2013 | Asano et al. ................. 180/68.1 |
| 2013/0252531 A1* | 9/2013 | Asano et al. ................... 454/155 |
| 2013/0255603 A1* | 10/2013 | Pursifull et al. ............. 123/41.15 |
| 2013/0255604 A1* | 10/2013 | Rollinger et al. ........... 123/41.15 |
| 2013/0255605 A1* | 10/2013 | Jentz et al. .................. 123/41.15 |
| 2013/0268164 A1* | 10/2013 | Sugiyama ....................... 701/49 |
| 2013/0275009 A1* | 10/2013 | Sakai ............................... 701/49 |
| 2013/0338870 A1* | 12/2013 | Farmer et al. ................. 701/29.2 |
| 2014/0005896 A1* | 1/2014 | Hirota et al. ..................... 701/49 |
| 2014/0005897 A1* | 1/2014 | Hayakawa et al. ............. 701/49 |
| 2014/0026831 A1* | 1/2014 | Mahrs et al. ................. 123/41.05 |
| 2014/0039765 A1* | 2/2014 | Charnesky et al. ............. 701/49 |
| 2014/0120820 A1* | 5/2014 | Glugla et al. ..................... 454/75 |
| 2014/0150756 A1* | 6/2014 | Smith et al. ..................... 123/563 |
| 2014/0230760 A1* | 8/2014 | Okamoto ................... 123/41.05 |
| 2014/0273806 A1* | 9/2014 | Frayer, III ...................... 454/335 |
| 2014/0273807 A1* | 9/2014 | Frayer, III ...................... 454/335 |
| 2014/0288788 A1* | 9/2014 | Hayakawa ...................... 701/49 |
| 2014/0290599 A1* | 10/2014 | Numata et al. ............. 123/41.05 |
| 2014/0370795 A1* | 12/2014 | Klop et al. ....................... 454/75 |

FOREIGN PATENT DOCUMENTS

| | | |
|---|---|---|
| JP | 2002-223505 A | 8/2002 |
| JP | 2003-274509 A | 9/2003 |
| JP | 2003-531334 A | 10/2003 |
| JP | 2004-324613 A | 11/2004 |
| JP | 2008-012963 A | 1/2008 |
| JP | 2009-298373 A | 12/2009 |
| JP | 2010-166644 A | 7/2010 |
| JP | 2012-197001 A | 10/2012 |

* cited by examiner

VEHICLE

INCORPORATION BY REFERENCE

The disclosure of Japanese Patent Application No. 2013-076631 filed on Apr. 2, 2013 including the specification, drawings and abstract is incorporated herein by reference in its entirety.

BACKGROUND OF THE INVENTION

1. Field of the Invention

The present invention relates to a vehicle, more specifically, the vehicle provided with a grille shutter.

2. Description of Related Art

A vehicle that has an openable and closable shutter mechanism (hereinafter also referred to as "grille shutter") on an air intake path for cooling a drive device of a vehicle is known. In such a vehicle, a grille shutter is used to adjust cooling performance of the drive device by adjusting an opening thereof or to reduce an air resistance of a vehicle by closing a shutter during high-speed travel.

Japanese Patent Application Publication No. 2012-197001 (JP 2012-197001 A) discloses a configuration in which when a failure (malfunction) of a grille shutter occurs in a vehicle with a grille shutter, occurrence of the failure is informed to a user.

When a failure occurs in an operation of the grille shutter and an opening of the grille shutter cannot sufficiently be secured, due to a decrease in an external air flow, a drive device such as an engine cannot sufficiently be cooled and may result in overheating or failure or degradation of a device.

In the configuration disclosed in JP 2012-197001 A, in the case where a failure of the grille shutter occurs, occurrence of the failure of the grille shutter can rapidly be informed to a user. Accordingly, even during a failure of the grill shutter, overheating or failure of the device can be prevented.

SUMMARY OF THE INVENTION

However, in JP 2012-197001 A, although a failure state is informed to a user, a concrete avoidance measure of the overheating or the like is not disclosed, that is, there is a room to study.

The present invention properly protects a driving source of a vehicle during occurrence of a failure of the grille shutter in a vehicle with a grille shutter.

A vehicle according to a first aspect of the present invention includes a driving source configured to generate a driving force; a shutter device configured to adjust an amount of air for cooling the driving source; a controller configured to control the driving source, the controller configured to restrict an operation of the driving source based on a temperature of the driving source when the controller detects a failure of the shutter device.

In the vehicle according to a first aspect of the present invention, the shutter device may be installed in a front grille of the vehicle. The shutter device may be configured to adjust an amount of air that passes through the front grill by adjusting an opening of the shutter. The controller may be configured to restrict an operation of the driving source when a failure where the opening of the shutter remains in a more closed state than a specified opening amount is detected.

In the vehicle according to a first aspect of the present invention, the driving source may include an internal combustion engine. The controller may be configured to restrict the operation of the driving source based on a temperature of the internal combustion engine.

In the vehicle according to a first aspect of the present invention, the controller may be configured to restrict at least one of a rotation speed and an output torque of the internal combustion engine when a failure of the shutter device is detected and a temperature of the internal combustion engine exceeds a specified reference temperature.

In the vehicle according to a first aspect of the present invention, the controller may be configured to stop the internal combustion engine when a failure of the shutter device is detected and a temperature of the internal combustion engine exceeds a specified reference temperature.

The vehicle according to a first aspect of the present invention may further include an energy storage device. The driving source may include a rotary electric machine and a power converter that drives the rotary electric machine with electric power from the energy storage device. The controller may be configured to limit an operation of the rotary electric machine based on a temperature of at least one of the rotary electric machine and the power converter.

In the vehicle according to a first aspect of the present invention, the power converter may include a converter that steps up an output voltage of the energy storage device. The controller may be configured to restrict a boosting operation of the converter when a failure of the shutter device is detected and a temperature of at least one of the rotary electric machine and the power converter exceeds a specified reference temperature that is determined in advance corresponding to each thereof.

In the vehicle according to a first aspect of the present invention, the controller may be configured to control the power converter such that a load factor of the rotary electric machine is limited when a failure of the shutter device is detected and a temperature of at least one of the rotary electric machine and the power converter exceeds a specified reference temperature that is determined in advance corresponding to each thereof.

The vehicle according to a first aspect of the present invention may include a cooling fan configured to cool a cooling medium by blowing air passed through the shutter device. A pump configured to deliver the cooled cooling medium to the driving source to cool the driving source may be included. The controller may be configured to control such that at least one of an amount of air of the cooling fan and a discharge amount of the pump is increased when the failure of the shutter device is detected and a temperature of the cooling medium equal to or exceeds a specified reference temperature than when the failure of the shutter device is detected and the temperature of the cooling medium lower than the specified reference temperature.

A vehicle according to a second aspect of the present invention includes an internal combustion engine; a cooler configured to cool the internal combustion engine with a cooling medium; a shutter device configured to adjust an amount of air for cooling the internal combustion engine; a cooling fan configured to cool the cooling medium by blowing air passed through the shutter device; a pump configured to deliver the cooling medium to the internal combustion engine; the controller configured to detect a failure of the shutter device and to select a normal travel mode when a temperature of the cooling medium is lower than a first reference temperature, the controller configured to detect the failure of the shutter device and to select a first travel mode when the temperature of the cooling medium exceeds the first reference temperature, the controller configured to control the cooler such that in the first travel mode, at least one of an amount of air of the cooling fan and a discharge amount of the pump is increased compared with the normal travel mode, the controller configured to select a second travel mode when the failure of the shutter device is detected and the temperature of the cooling medium exceeds a second reference temperature that is higher than the first reference temperature, the controller configured to limit at least one of a rotation speed and an output torque of the internal combustion engine in the second travel mode as compared with that of the normal travel mode, the controller configured to select a third drive mode when the failure of the shutter device is detected and the temperature of the cooling medium exceeds a third reference temperature higher than the second reference temperature, the controller configured to stop the internal combustion engine in the third drive mode.

In the vehicle according to a second aspect of the present invention, the controller may be configured to switch the drive mode from the first travel mode to the normal travel mode when the temperature of the cooling medium falls below a fourth reference temperature that is lower than the first reference temperature during the selection of the first travel mode. The controller may be configured to switch the drive mode from the second travel mode to the first travel mode when the temperature of the cooling medium falls below a fifth reference temperature during the selection of the second travel mode. The fifth reference temperature is between the first reference temperature and the second reference temperature. The controller may be configured to switch the drive mode from the third drive mode to the second travel mode when the temperature of the cooling medium falls below a sixth reference temperature during the selection of the third drive mode. The sixth reference temperature is between the second reference temperature and the third reference temperature.

A vehicle according to a third aspect of the present invention includes an energy storage device; a rotary electric machine; and a drive device; and a power converter that drives the rotary electric machine with electric power from the energy storage device, the power converter that includes a chopper circuit having upper and lower arms of a switching element and a converter that steps up an output voltage of the energy storage device; a cooler configured to cool the drive device with a cooling medium; a shutter device configured to adjust an amount of air for cooling the drive device; a cooling fan configured to cool the cooling medium by bowing air passed through the shutter device; a pump configured to deliver the cooling medium to the drive device; the controller configured to select a normal travel mode when a failure of the shutter device is detected and a temperature of the cooling medium falls below a first reference temperature, the controller configured to select a first travel mode when the failure of the shutter device is detected and the temperature of the cooling medium exceeds the first reference temperature, the controller configured to control the cooler such that in the first travel mode, at least one of an amount of air of the cooling fan and a discharge amount of the pump is increased compared with the normal travel mode, the controller configured to select a second travel mode when the failure of the shutter device is detected and the temperature of the cooling medium exceeds a second reference temperature that is higher than the first reference temperature, the controller configured to hold the upper arms of the switching element in a conduction state in the second travel mode, the controller configured to select a third drive mode when the failure of the shutter device is detected and the temperature of the cooling medium exceeds a third reference temperature higher than the second reference temperature, the controller configured to control the power converter such that the load rate of the rotary electric machine is limited compared with the normal travel mode in the third drive mode.

In the vehicle according to a third aspect of the present invention, the controller may be configured to switch the drive mode from the first travel mode to the normal travel mode when the temperature of the cooling medium falls below a fourth reference temperature during the selection of the first travel mode. The fourth reference temperature is lower than the first reference temperature. The controller may be configured to switch the drive mode from the second travel mode to the first travel mode when the temperature of the cooling medium falls below a fifth reference temperature during the selection of the second travel mode. The fifth temperature is between the first reference temperature and the second reference temperature. The controller may be configured to switch the drive mode from the third drive mode to the second travel mode when the temperature of the cooling medium falls below a sixth reference temperature during the selection of the third drive mode. The sixth reference temperature is between the second reference temperature and the third reference temperature.

In the present invention, in a vehicle provided with a grille shutter, a drive source of the vehicle can be properly protected when a failure of the grille shutter occurs.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the present invention will be detailed with reference to the drawings. The same reference mark is given to the same or corresponding part in the drawing and description thereof is not repeated.

Figure 1:
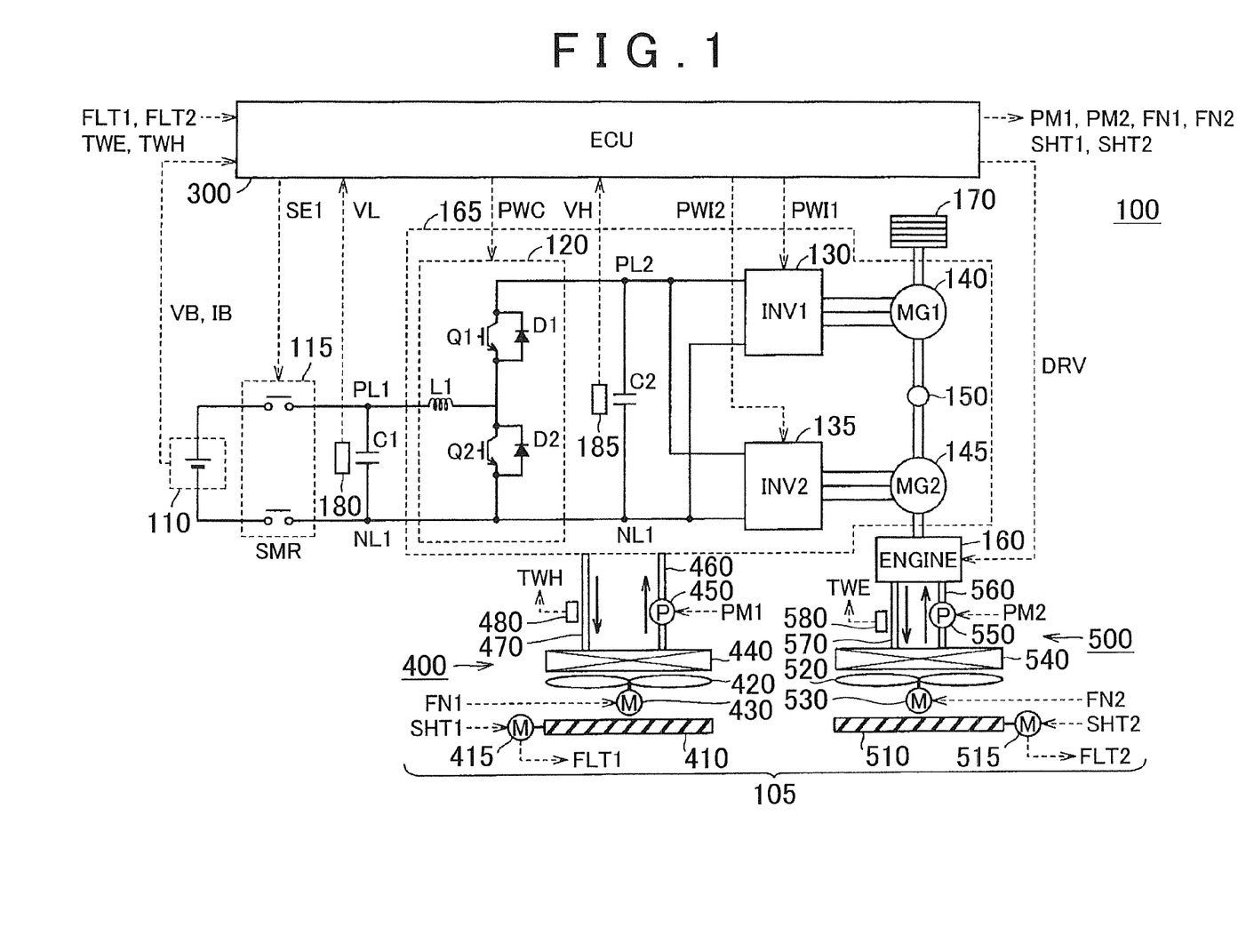
FIG. 1 is an entire block diagram of a vehicle corresponding to a first embodiment of the present invention.

Firstly, a first embodiment of the present invention will be described. FIG. 1 is an entire block diagram of a vehicle 100 according to a first embodiment of the present invention. With reference to FIG. 1, the vehicle 100 includes an energy storage device 110, a system main relay (SMR) 115, a drive device 105, and an ECU (Electronic Control Unit) 300 that is a controller.

The drive device 105 includes an engine 160 that is an internal combustion engine, an electric driving part 165, a driving wheel 170, and coolers 400 and 500. The electric driving part 165 includes a converter 120, inverters 130 and 135, motor generators 140 and 145 that are a rotary electric machine, a power transmission gear 150, and capacitors C1 and C2.

In FIG. 1, a hybrid vehicle in which an engine 160 and motor generators 140 and 145 are included will be described as an example of a hybrid vehicle. However, the present invention can be applied also to a vehicle that travels only with a driving force from an engine, and an electric vehicle or a fuel cell vehicle that does not include an engine and travels with only a driving force from a motor generator. Further, when the motor generator is used, the present invention can be applied to the case where one motor generator is disposed or also to the case where two or more motor generators are disposed.

The energy storage device 110 is an electric power storage element configured to be capable of charging and discharging. The energy storage device 110 is configured by including a secondary battery such as a lithium ion battery, a nickel hydride battery or a lead storage battery, or an energy storage element such as an electric double-layer capacitor.

The energy storage device 110 is connected to the converter 120 through electric power lines PL1 and NL1. The energy storage device 110 delivers an electric power for generating a driving force of the vehicle 100 to the electric driving part 165. Further, the energy storage device 110 stores electric power generated in the motor generators 140 and 145. An output of the energy storage device 110 is about 200 V, for example.

The SMR 115 includes a relay connected to between a positive electrode terminal of the energy storage device 110 and the electric power line PL1 and a relay connected to between a negative electrode terminal of the energy storage device 110 and the electric power line NL1. Then, the SMR 115 switches supply and block of the electric power between the energy storage device 110 and the electric driving part 165 by controlling these relays based on a control signal SE1 from the ECU 300.

The capacitor C1 is connected to between the electric power line PL1 and the electric power line NL1. The capacitor C1 reduces a fluctuation in voltage between the electric power line PL1 and the electric power line NL1. A voltage sensor 180 detects a voltage VL applied on the capacitor C1 and outputs the detected value to the ECU 300.

The converter 120 includes switching elements Q1 and Q2, diodes D1 and D2, and a reactor L1.

The switching elements Q1 and Q2 are connected to between the electric power line PL2 and the electric power line NL1 in series with a direction from the electric power line PL2 toward the electric power line NL1 as a forward direction. In the present embodiment, as the switching element, an IGBT (Insulated Gate Bipolar Transistor), a power MOS (Metal Oxide Semiconductor) transistor, or a power bipolar transistor can be used.

With respect to the switching elements Q1 and Q2, each of antiparallel diodes D1 and D2 is connected. The reactor L1 is disposed between a connection node of the switching elements Q1 and Q2 and the electric power line PL1. That is, the converter 120 forms a step-up/down type chopper circuit.

The switching elements Q1 and Q2 are controlled by a control signal PWC from the ECU 300, and a voltage conversion operation is performed between the electric power line PL1 and the electric power line NL1, and the electric power line PL2 and the electric power line NL1.

The converter 120 is fundamentally controlled such that the switching elements Q1 and Q2 are complementally and alternately turned on or turned off within each switching period. The converter 120 steps up a direct current voltage VL to a direct current voltage VH during a step-up operation. The step-up operation is performed in such a manner that electromagnetic energy stored in the reactor L1 during an ON period of the switching element Q2 is supplied to the electric power line PL2 through the switching element Q1 and the antiparallel diode D1.

Further, the converter 120 steps down the direct current voltage VH to a direct current voltage VL during a step-down operation. The step-down operation is performed in such a manner that electromagnetic energy stored in the reactor L1 during an ON period of the switching element Q1 is supplied to the electric power line NL1 through the switching element Q2 and the antiparallel diode D2.

A voltage conversion ratio (a ratio of VH and VL) in these step-up operation and step-down operation is controlled by an on period ratio (duty ratio) of the switching elements Q1 and Q2 in the switching period. When the step-up operation and the step-down operation are not necessary (that is, VH=VL), by setting the control signal PWC such that the switching elements Q1 and Q2 each are fixed to ON and OFF, the voltage conversion ratio=1.0 (duty ratio=100%) can be set.

The inverters 130 and 135 are connected in parallel to the electric power lines PL2 and NL1. Each of the inverters 130 and 135 is controlled based on control signals PWI1 and PWI2 from the ECU 300 and drives each of the motor generators 140 and 145 by converting a direct current electric power supplied from the converter 120 into an alternative electric power.

The capacitor C2 is connected between the electric power line PL2 and the electric power line NL1 that couple the converter 120 and the inverters 130 and 135. The capacitor C2 reduces a voltage fluctuation between the electric power line PL2 and the electric power line NL1. The voltage sensor 185 detects a voltage VH applied on the capacitor C2 and outputs the detected value to the ECU 300.

Each of the motor generators 140 and 145 is an alternative rotary electric machine, for example, a permanent magnet synchronous electric machine provided with a rotor in which a permanent magnet is embedded.

Output torques of the motor generators 140 and 145 are transmitted to a driving wheel 170 through the power transmission gear 150 configured to include a power split mechanism represented by a reducer or a planetary gear and drive the vehicle 100. The motor generators 140 and 145 can generate electric power by a rotative force of the driving wheel 170 during a regenerative control operation of the vehicle 100. The generated electric power is converted into a charging electric power of the energy storage device 110 by the inverters 130 and 135 and the converter 120 and charges the energy storage device 110.

The motor generators 140 and 145 are coupled also with the engine 160 through the power transmission gear 150. The ECU 300 operates the motor generators 140 and 145 and the engine 160 in a cooperative manner to generate a necessary vehicle driving force. Further, the motor generators 140 and 145 can generate electric power by a rotation of the engine 160 or a rotation of the driving wheel 170 and can charge the energy storage device 110 using the generated electric power. In the present embodiment, the motor generator 145 is exclusively used as an electric machine for driving the driving wheel 170, and the motor generator 140 is exclusively used as a power generator that is driven by the engine 160.

An output shaft of the motor generator 140 is coupled with a sun gear of a planetary gear (not shown in the drawing) that is contained in the power transmission gear 150. An output shaft of the motor generator 145 is coupled with a ring gear of the planetary gear through the reducer. An output shaft of the engine 160 is coupled with a planetary carrier of the planetary gear.

The coolers 400 and 500 each are a device that cools the electric driving part 165 or the engine 160 with a cooling medium such as cooling water.

The cooler 400 includes a grille shutter 410, a cooling fan 420, a radiator 440, and an electric pump 450.

The radiator 440 is connected to the electric driving part 165 with cooling pipes 460 and 470. The electric pump 450 is disposed in the cooling pipe 460 and delivers a cooling medium cooled by the radiator 440 to the electric driving part 165. The delivered cooling medium performs heat exchange by circulating in a medium path disposed inside or on outer surfaces of the converter 120, the inverters 130 and 135 and the motor generators 140 and 145 in the electric driving part 165 and by cooling these machines. The ECU 300 controls the rotation speed of the electric pump 450 by the control signal PM1 and adjusts an amount of the cooling medium delivered from the electric pump 450. The cooling medium heated due to heat exchange is returned to the radiator 440 by the cooling pipe 470 and cooled again with an external air.

The grille shutters 410 disposed on an air intake path such as a front grille (not shown in the drawing) of the vehicle 100, for example, and adjusts an amount of air that is introduced into an engine room where the engine 160 and the motor generators 140 and 145 are housed. The grille shutter 410 includes a plurality of movable fins that are driven by a motor 415. The motor 415 is controlled by a control signal SHT1 from the ECU 300 and adjusts the opening of the movable fins. Thus, an amount of air that is introduced through the grille shutter 410 into the radiator 440 can be adjusted.

Further, when the grille shutter 410 is completely closed, since air resistance of the vehicle 100 can be reduced and air introduced into the engine room is reduced, a lifting power can be suppressed from being generated. Still further, due to an air flow in front of the vehicle to a downward side of a floor bed, a down force that pulls the vehicle to a downward direction can be generated. Thus, in particular, during high-speed travel, a traveling state of the vehicle can be stabilized.

Air passed through the grille shutter 410 is supplied to the radiator 440 by the cooling fan 420. The cooling fan 420 is an electric fan driven by the motor 430, and a rotation speed thereof is adjusted by a control signal FN1 from the ECU 300. Thus, when the rotation speed of the cooling fan 420 is adjusted, an amount of air supplied to the radiator 440 is changed and cooling efficiency of the cooling medium in the radiator 440 is adjusted.

The cooling pipe 470 is provided with a temperature sensor 480. The temperature sensor 480 detects a temperature of the cooling medium that is returned from the electric driving part 165 to the radiator 440 and outputs the detected value TWH to the ECU 300.

In the present invention, it is not necessarily indispensable for the cooling fan 420 to have a function of adjusting an amount of air and the electric pump 450 to have a function of adjusting a flow rate, and these each may have a function of supplying a definite amount of air and a definite amount of flow rate by rotating at a constant speed. However, in the switching control of the travel mode described below in FIG. 2 and on, at least one of the cooling fan 420 and the electric pump 450 is preferable to have an adjusting function.

The cooler 500 is a device for cooling the engine 160 and a fundamental configuration thereof is the same as that of the cooler 400. Therefore, a detailed description of the cooler 500 is not repeated.

In FIG. 1, a case where the cooler 400 for cooling the electric driving part 165 and the cooler 500 for cooling the engine 160 are separately disposed is described as an example. However, a configuration in which the electric driving part 165 and the engine 160 are cooled with one cooler can be formed. Alternatively, for example, a configuration in which circulating systems of the cooling medium are independently disposed but the cooling fan and/or grille shutter are disposed in common use can be used. When the cooler 400 and the cooler 500 are separately disposed, each of the coolers 400 and 500 can independently be controlled.

The ECU 300 includes a CPU (Central Processing Unit), a memory device and an input/output buffer, all of which are not shown in FIG. 1, inputs signals from the respective sensors and outputs control signals to respective devices, and controls the vehicle 100 and respective devices. These controls are not limited to processing with software but can process with an exclusive hardware (electronic circuit).

The ECU 300 calculates a charge state SOC of the energy storage device 110 based on detected values of a voltage VB and a current IB from a voltage sensor and a current sensor (both are not shown in the drawing) which are included in the energy storage device 110.

The ECU 300 generates control signals PWC, PWI1, and PWI2 of the converter 120 and inverters 130 and 135 and a control signal DRV of the engine 160 by a requirement power calculated based on an operation amount of an accelerator pedal (not shown in the drawing) by a user.

In FIG. 1, a configuration in which one controller is disposed as the ECU 300 is shown, however, a configuration in which separate controllers are disposed for every functions or for every devices to be controlled such as a controller for the drive device 105 and a controller for the energy storage device 110 may be formed.

In the hybrid vehicle 100 like this, in some cases, an EV travel in which only a driving force due to the motor generator is used to travel is used to improve the fuel consumption of the engine 160. In the EV travel, the motor generator 145 is driven using an electric power from the energy storage device 110 and/or an electric power generated by the motor generator 140. The engine 160 is started when in the EV travel, a requirement power by an operation of a user cannot be output only by the motor generator 145, or when the energy storage device 110 is necessary to be charged.

Next, a travel mode switching control according to a first embodiment of the present invention will be described. In a vehicle that has a grille shutter in a cooler for cooling a drive device such as described above, a case where a failure of the grille shutter occurs, an opening/closing operation thereof cannot be performed, and the grille shutter remains closed or in a state of nearly closed, that is, a state where the shutter remains in a state where the shutter opening is a specified opening amount or less (hereinafter also referred to as "closing failure state) is considered.

When such a state occurs, sufficient external air cannot be supplied to the radiator of the cooler. Therefore, for example, in the case where the drive device is operated under a high load state for a relatively long time, since the drive device cannot properly be cooled, the engine is overheated, a temperature of the power conversion device such as the converter or the inverter rises, and degradation or failure of the device may be caused.

Therefore, in the present embodiment, in the case where the closing failure state occurs in the grille shutter in a vehicle that mounts the grille shutter, a travel mode switching operation is performed, in which a travel mode is switched in accordance with a temperature (that is, a temperature of the cooling medium) of the drive device and an operation restriction of the drive device is performed. Thus, the device can be protected by suppressing heat generation of the drive device.

Figure 2:
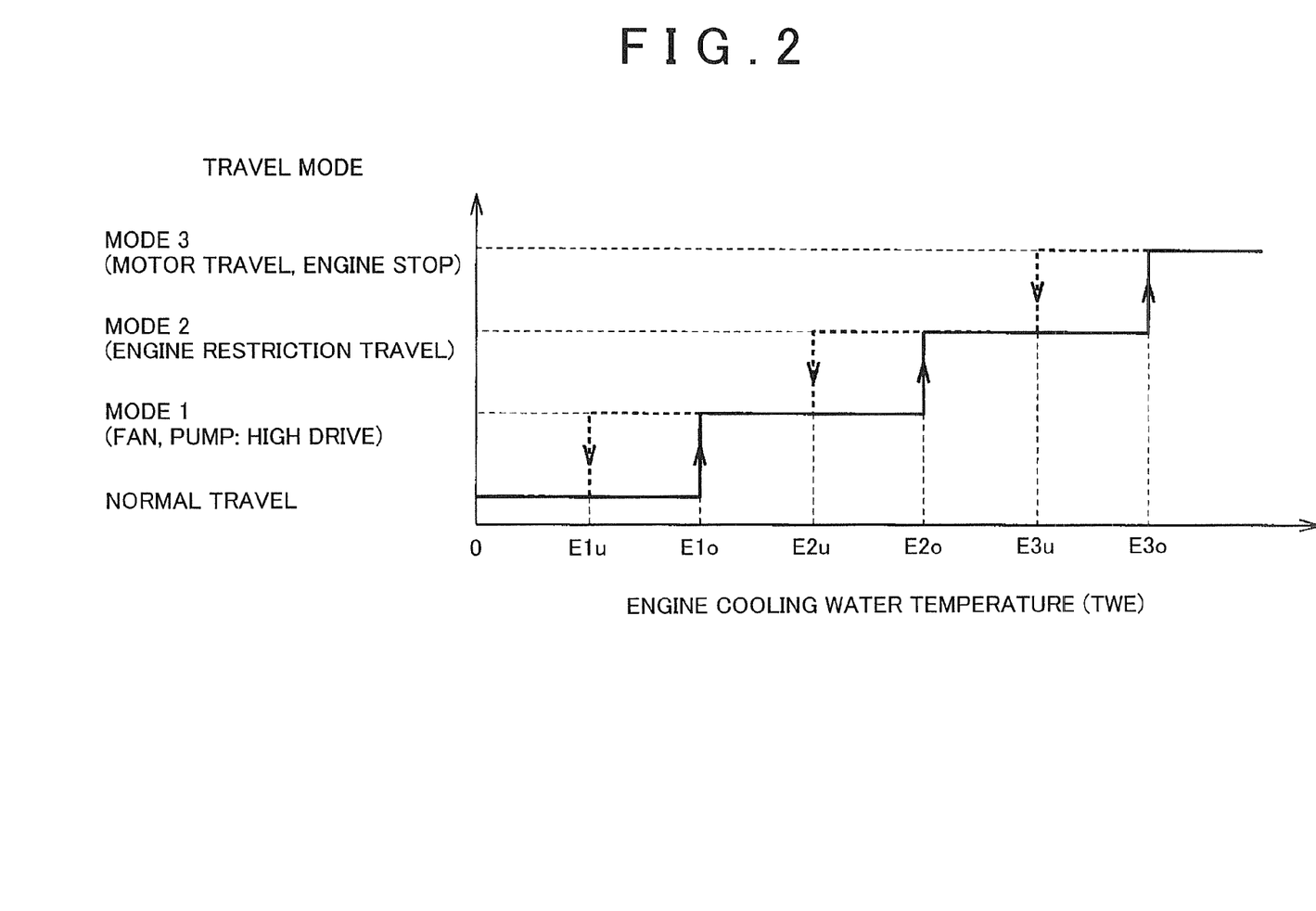
FIG. 2 is a diagram that describes a transition of a travel mode of an engine during failure of a grille shutter.

FIG. 2 is a diagram for describing a transition of a travel mode when the closing failure state occurs in the grille shutter 510 in the cooler 500 for the engine 160 in the present embodiment. In the present embodiment, as the travel mode for the engine 160, other than a normal travel mode that is selected in the case of no failure, three travel modes corresponding to a cooling water temperature TWE are disposed.

With reference to FIG. 1 and FIG. 2, a first travel mode (hereinafter also referred to as "MODE 1") is a mode to which a normal travel mode transits corresponding to a rise of the cooling water temperature TWE of the engine 160 to a threshold value $E1o$. In the MODE 1, a high drive state of the cooling fan 520 and/or the electric pump 550 is maintained to improve cooling capacity of the cooler 500. Thus, an amount of air of the cooling fan 520 and/or a discharge amount of the electric pump 550 is increased, and the cooling capacity of the cooler 500 is improved. In the MODE 1, since an operation restriction of the engine 160 is not implemented, the travel performance the same as that of the normal travel mode can be maintained.

When the cooling capacity is deficient even in the state of the MODE 1 and a cooling water temperature TWE of the engine 160 rises to a threshold value $E2o$ ($>E1o$), the travel mode transits to a second travel mode (hereinafter also referred to as "MODE 2"). In the MODE 2, an upper limit in a settable range of the rotation speed and/or torque of the engine 160 is limited lower than that of the normal travel mode. Thus, while the travel performance is slightly degraded, since load on the engine 160 is decreased, the engine 160 can be suppressed from generating heat. Also in the MODE 2, it is preferable that the cooling fan 520 and the electric pump 550 of the cooler 500 are subsequently set to a high drive state. Further, the restriction on the rotation speed and torque of the engine 160 may be uniform with respect to the cooling water temperature TWE or may be set higher than a limited amount as the temperature TWE rises.

Even when the load restriction due to the MODE 2 is applied, the cooling capacity is still insufficient and the cooling water temperature TWE of the engine 160 rises to a further higher threshold value $E3o$ ($>E2o$), the travel mode transits to a third travel mode (hereinafter also referred to as "MODE 3"). In the MODE 3, it is determined that the cooler 500 can no longer cool the engine 160, and the engine 160 is stopped. At this time, in the case of a hybrid vehicle 100 shown in FIG. 1, a travel is continued according to a travel that uses only a driving force from the motor generator. On the other hand, in the case of a vehicle that uses only the engine 160 as the driving source, since overheating is caused due to continuation of drive of the engine 160, the travel of the vehicle 100 cannot be continued.

In the case where the cooling is sufficiently performed in each of the travel modes MODE 1 to MODE 3, as the temperature goes down, in an opposite direction from the above, the travel mode transits. That is, a travel mode transits from the MODE 3 to the MODE 2, from the MODE 2 to the MODE 1, and from the MODE 1 to the normal travel mode.

At this time, a threshold value of the cooling water temperature TWE, which causes the transition of the travel mode is preferably provided with hysteresis in order to prevent so-called chattering in which the transition of the travel mode is frequently repeated in the proximity of the threshold value from occurring. For example, in a state of the MODE 3 in FIG. 2, corresponding to a decrease of the cooling water temperature TWE to a threshold value $E3u$ ($E2o<E3u<E3o$), the travel mode transits to the MODE 2. Further, in a state of the MODE 2, corresponding to a decrease of the cooling water temperature TWE to a threshold value $E2u$ ($E1o<E2u<E2o$), the travel mode transits to the MODE 1. Still further, in a state of the MODE 1, corresponding to a decrease of the cooling water temperature TWE to a threshold value $E1u$ ($E1u<E1o$), the travel mode transits to the normal travel mode.

Figure 3:
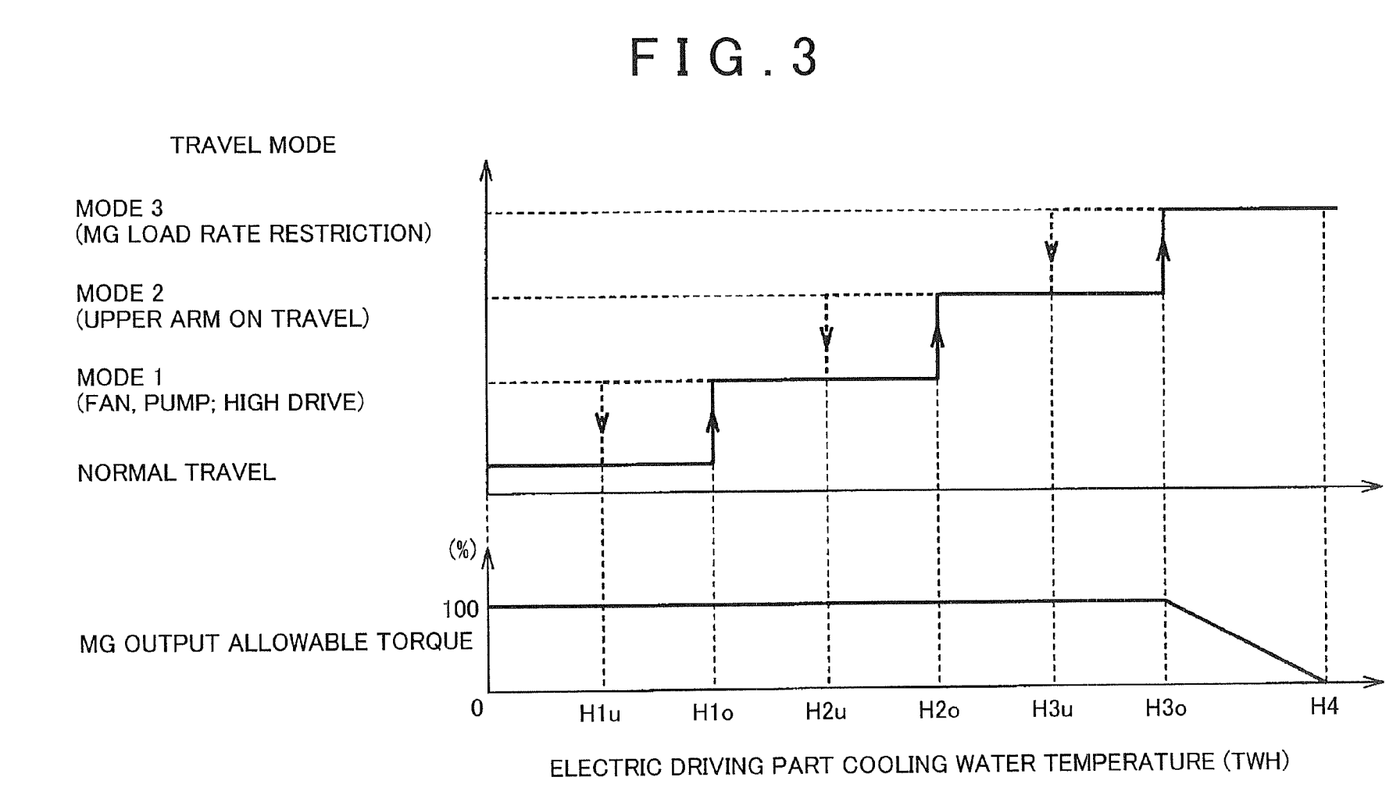
FIG. 3 is a diagram that describes a transition of a travel mode of an electric driving part during a failure of the grille shutter.

FIG. 3 is a diagram for describing a transition of a travel mode when a closing failure state of the grille shutter 410 occurs in the cooler 400 for the electric driving part 165 in the first embodiment of the present invention. In the present embodiment, as a travel mode for the electric driving part 165, other than the normal travel mode, three travel modes corresponding to the cooling water temperature TWH are disposed. Also for each of the travel modes for the electric driving part 165, for convenience purpose, names of MODE 1, MODE 2 and MODE 3 are used.

With reference to FIG. 1 and FIG. 3, when the cooling water temperature TWH of the electric driving part 165 rises up to a threshold value $H1o$, the travel mode transits from the normal travel mode to the MODE 1. In the MODE 1, in the same manner as the engine 160, the cooling fan 420 and/or the electric pump 450 of the cooler 400 are maintained in a high drive state, and the cooling capacity is increased.

Then, corresponding to a rise of the cooling water temperature TWH up to a threshold value $H2o$ ($>H1o$), the travel mode transits to the MODE 2. In the MODE 2, a switching element Q1 that is an upper arm of the converter 120 is fixed to an on-state and a switching element Q2 that is a lower arm is fixed to an off-state (hereinafter also referred to as "upper arm on travel"). That is, in the MODE 2, a switching operation of the converter 120 is stopped, and heat generation due to the converter 120 is suppressed. In the MODE 2, when a switching operation is more suppressed compared with the normal travel mode, the switching operation of the converter 120 is not limited to a case of the "upper arm ON travel" where a switching operation of the converter 120 is completely stopped. For example, a voltage stepping-up ratio may be set lower than that of the normal travel mode.

In the MODE 2, since the switching element Q1 of the converter 120 remains in a conduction state, a voltage step-up operation in the converter 120 is not performed, and a voltage VH applied to the inverter 130 and 135 is nearly the same as the output voltage VB ($\approx$VL) of the energy storage device 110. Since current capacities of the inverter and the motor generator are limited, when the voltage VH is limited like this, resultantly, electric power (that is, a driving force that can be output by the motor generator 145) that can be supplied to the motor generator 145 is limited. In the same manner as the case of the engine 160, in the MODE 2, the cooling fan 420 and the electric pump 450 are preferably maintained in a high drive state.

When the cooling water temperature TWH continues to rise even when the operation restriction of the converter 120 is performed in the MODE 2, and becomes higher than a threshold value $H3o$ ($>H2o$), a travel mode transits to the MODE 3. In the MODE 3, the load rates of the inverters 130 and 135 are limited, and heat generation due to the inverters 130 and 135 and the motor generators 14 and 145 can be suppressed.

More specifically, as shown in a lower step of FIG. 3, as the cooling water temperature TWH rises, an output allowable torque of the motor generator is set to decrease. In addition thereto or in place thereof, an allowable rotation speed of the motor generator may be limited corresponding to the cooling water temperature TWH.

In the MODE 3, when the cooling water temperature TWH rises up to H4 (>H3o), the output allowable torque of the motor generator is set to zero, and a travel that uses the driving force from the motor generator is inhibited.

Also the electric driving part 165 is preferably provided with hysteresis in the same manner as the case of the engine 160 in the transition of the travel mode when the cooling water temperature TWH becomes lower.

As shown in FIG. 1, when a cooling system of the electric driving part 165 and a cooling system of the engine 160 are independent from each other, since the cooling water temperatures TWH and TWE are different from each other, in each of the cooling systems, a travel mode can independently be transited corresponding to each of the cooling water temperatures. However, when the electric driving part 165 and the engine 160 are cooled by a common cooling system, the cooling water temperatures TWH and TWE may result in the same. The respective threshold values described above can properly be set corresponding to the heat resistance of the respective devices.

In the present invention, it is not indispensable to have all of the travel modes MODE 1 to MODE 3 shown in FIG. 2 and FIG. 3, that is, at least one of these travel modes may be contained.

Figure 4:
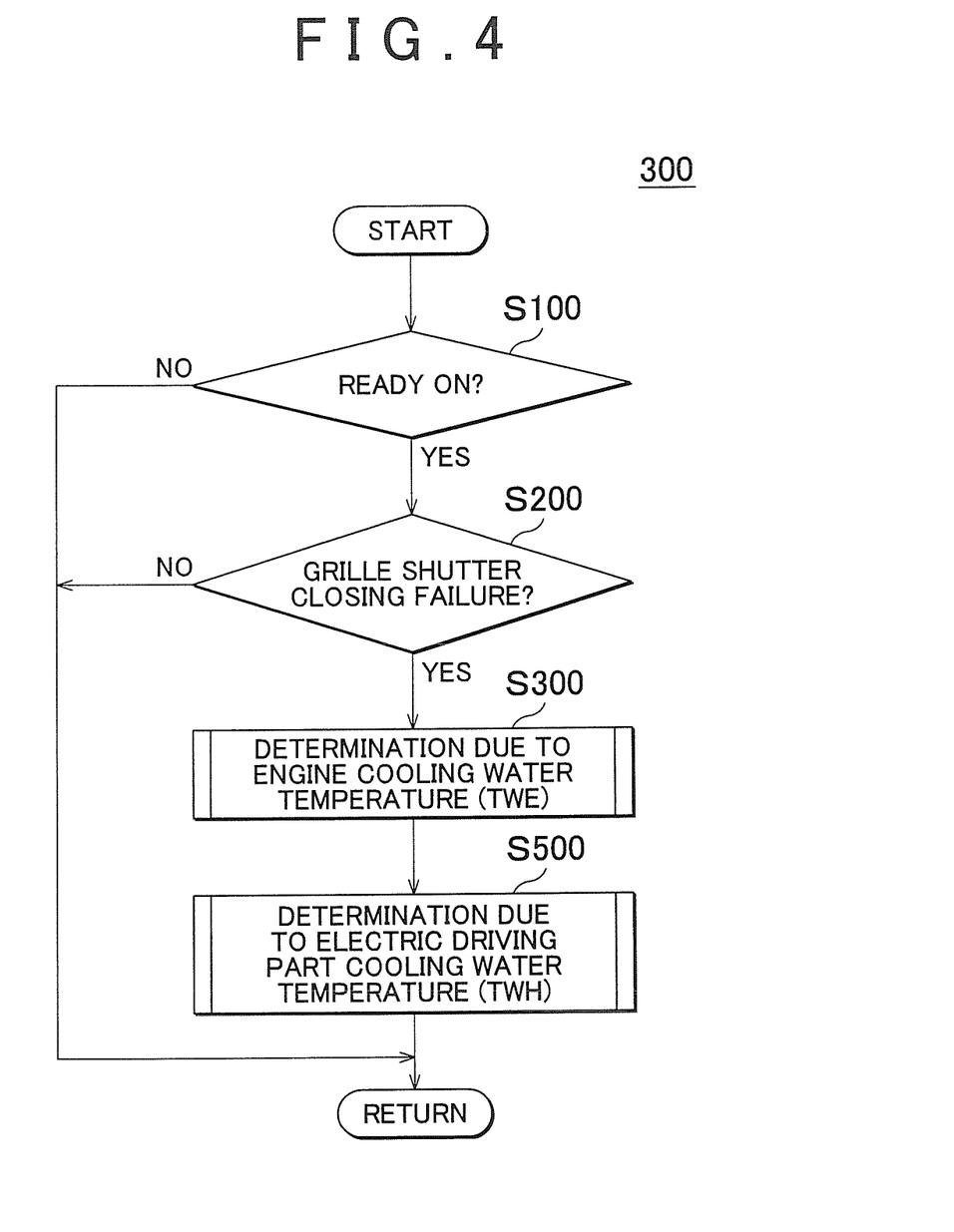
FIG. 4 is a flowchart that describes switching control of a travel mode, which is executed in an ECU in the present embodiment.

FIG. 4 is a flow chart for describing a switching control process of a travel mode that is executed in the ECU 300 in the first embodiment of the present invention. Each of the steps in the flowcharts shown in FIG. 4 and FIGS. 5 and 6 described below can be realized by executing programs stored in advance in the ECU 300 at a specified period. Alternatively, for a part of the steps, a process can be realized by configuring an exclusive hardware (electronic circuit).

With reference to FIG. 4, the ECU 300 determines whether the vehicle 100 is in a Ready-On state that is a state where the vehicle 100 can travel, in the step (hereinafter, step is abbreviated as S) 100. For example, when, in response to an operation of an ignition key or an ignition switch due to a user, the system is initiated and the SMR 115 is closed, it can be determined to be in a Ready-ON state.

In the case of not Ready-On state (NO in S 100), it is not a state where the travel is possible, and a switching control of the travel mode is not necessary, thus, processes thereafter are skipped and the process is returned to a main routine.

In the case in a Ready-ON state (YES in S100), the process is forwarded to S200, and the ECU 300 determines whether the grille shutters 410 and 510 of the cooler 400 or 500 are in a closing failure state. The failure in the grille shutter can be determined with a change in rotary angles of the motors 415 and 515 for driving the grille shutters 410 and 510, positions of the movable fins, and failure signals or the like from the motors 415 and 515 when a shutter opening/closing instruction is output, for example.

In the case of no failure in the grille shutters 410 and 510 (NO in S200), since the coolers 400 and 500 can properly cool, the process is returned to the main routine.

In the case where a failure occurs to the grille shutters 410 and 510 (YES in S200), the process is forwarded to S300, and the ECU 300 executes a determination process of a travel mode based on the cooling water temperature TWE of the engine 160 as described in FIG. 2. Then, the ECU 300 executes in S500 a determination process of a travel mode based on the cooling water temperature TWH of the electric driving part 165. Hereinafter, with reference to FIG. 5 and FIG. 6, each of the steps S300 and S500 will be described in detail.

Figure 5:
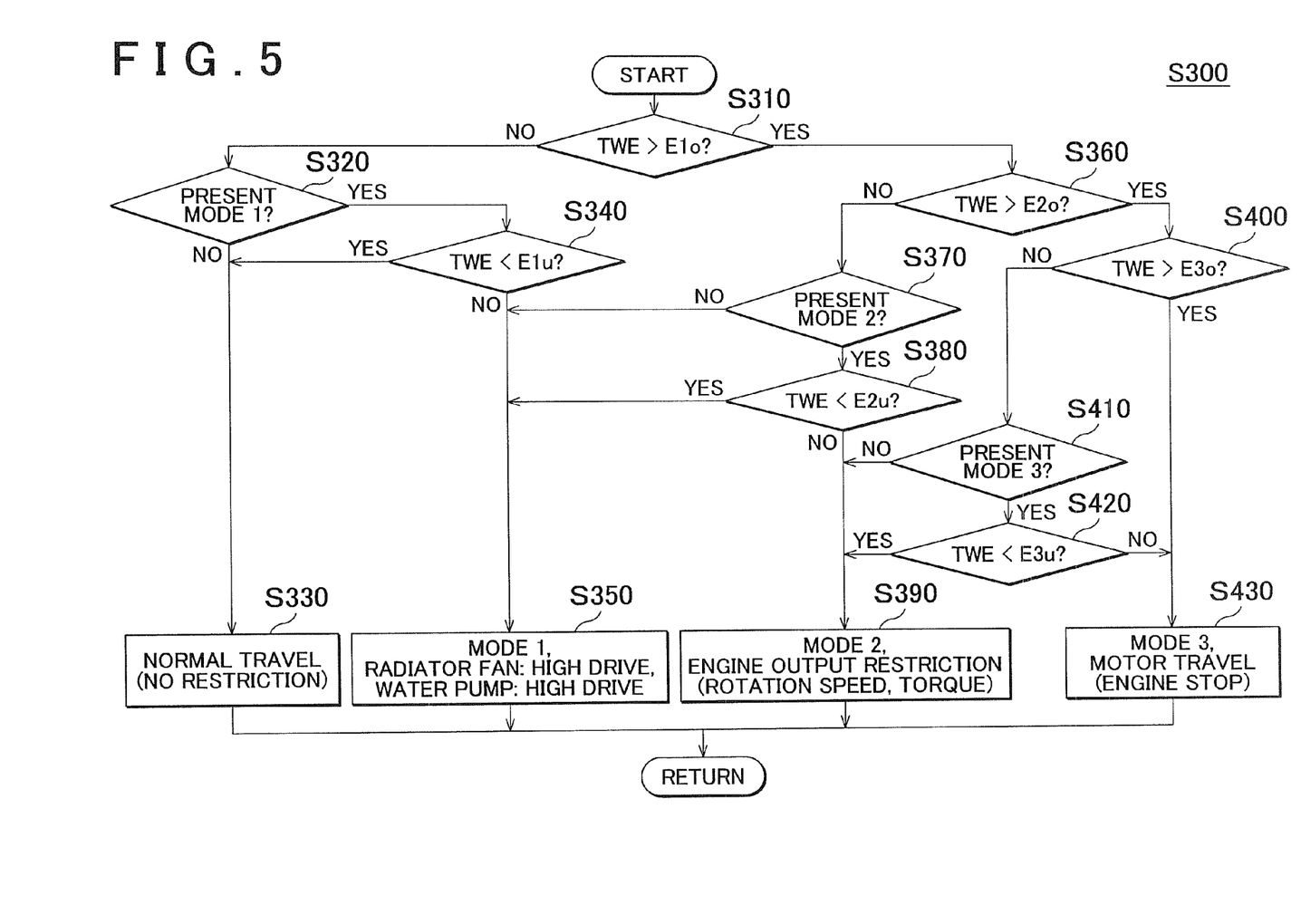
FIG. 5 is a flowchart that describes a detail of a step S300 in FIG. 4.

With reference to FIG. 5 together with FIG. 2, the ECU 300 determines in S310 whether the cooling water temperature TWE of the engine 160 is higher than the threshold value E1o.

When the cooling water temperature TWE is the threshold value E1o or less (NO in S310), the process is forwarded to S320, and the ECU 300 determines whether a present travel mode is the MODE 1.

When the present travel mode is not the MODE 1 (NO in S320), the ECU 300 selects in S330 a normal travel mode that has not restriction. When the present travel mode is the MODE 1 (YES in S320), the process is forwarded to S340, and the ECU 300 determines whether the cooling water temperature TWE is lower than the threshold value E1u, and when the cooling water temperature TWE is lower than the threshold value E1u (YES in S340), a travel mode is switched from the MODE 1 to the normal travel mode (S330). On the other hand, when the cooling water temperature TWE is the threshold value E1u or more (YES in S340), the ECU 300 maintains the MODE 1 in S350. As described in FIG. 2, in the MODE 1, the ECU 300 maintains a high drive state of the cooling fan 520 and/or the electric pump 550.

When the cooling water temperature TWE is higher than the threshold value E1o in S310 (YES in S310), the process is forwarded to S360, and the ECU 300 determines next whether the cooling water temperature TWE is higher than a threshold value E2o.

When the cooling water temperature TWE is the threshold value E2o or less (NO in S360), the process is forwarded to S370, and the ECU 300 determines whether a present travel mode is the MODE 2. When the present travel mode is not the MODE 2 (NO in S370), the ECU 300 selects the MODE 1 as the travel mode (S350).

When the present travel mode is the MODE 2 (YES in S370), the process is forwarded to S380, and the ECU 300 determines whether the cooling water temperature TWE is lower than the threshold value E2u. When the cooling water temperature TWE is lower than the threshold value E2u (YES in S380), the ECU 300 switches the travel mode from the MODE 2 to the MODE 1 (S350). When the cooling water temperature TWE is the threshold value E2u or more (NO in S380), the process is forwarded to S390, and the ECU 300 maintains the MODE 2 as the travel mode. In the MODE 2, the ECU 300 limits the rotation speed and/or torque of the engine 160.

When the cooling water temperature TWE is higher than the threshold value E2o in S360 (YES in S360), the process is forwarded to S400, and the ECU 300 next determines whether the cooling water temperature TWE is higher than the threshold value E3o.

When the cooling water temperature TWE is higher than the threshold value E3o (YES in S400), the process is forwarded to S430, and the ECU 300 selects the MODE 3 as the travel mode. In the MODE 3, the ECU 300 stops the engine 160, and in the case of a hybrid vehicle, a motor travel is performed.

When the cooling water temperature TWE is the threshold value E3o or less (NO in S400), the process is forwarded to S410, and the ECU 300 determines whether the present travel mode is the MODE 3. When the present travel mode is not the MODE 3 (NO in S410), the ECU 300 selects the MODE 2 as the travel mode (S350) (S390).

When the present travel mode is the MODE 3 (YES in S410), the process is forwarded to S420, and the ECU 300 determines whether the cooling water temperature TWE is lower than the threshold value E3$u$. Then, the ECU 300 switches the travel mode from the MODE 3 to the MODE 2 (S390) when the cooling water temperature TWE is lower than the threshold value E3$u$ (YES in S420), and maintains the MODE 3 (S430) when the cooling water temperature TWE is the threshold value E3$u$ or more (NO in S420).

Figure 6:
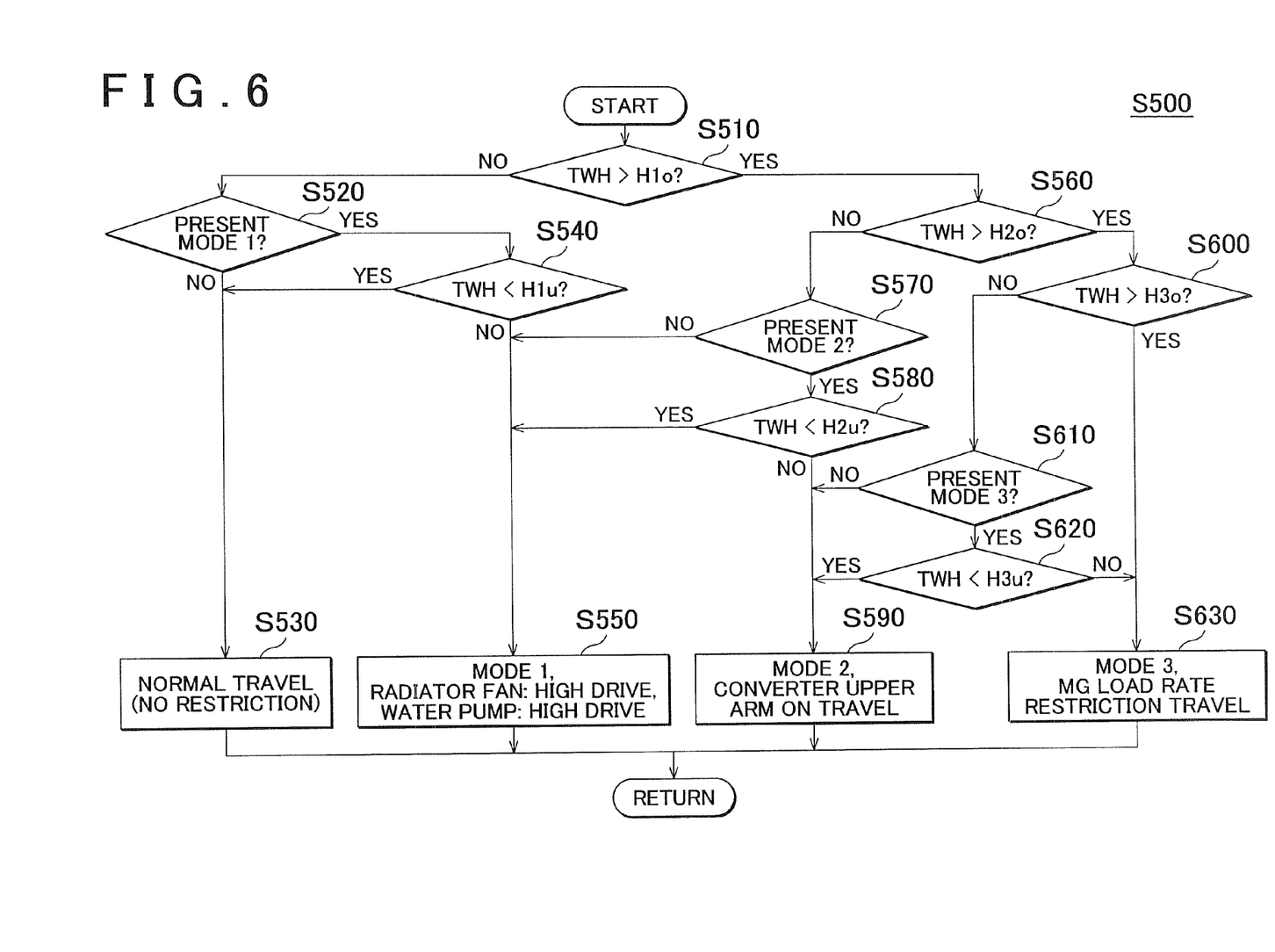
FIG. 6 is a flowchart that describes a detail of a step S500 in FIG. 4.

Next, with reference to FIG. 6 together with FIG. 3, the ECU 300 determines whether the cooling water temperature TWH of the electric driving part 165 is higher than the threshold value H1$o$, in S510.

When the cooling water temperature TWH is the threshold value H1$o$ or less (NO in S510), the process is forwarded to S520, and the ECU 300 determines whether the present travel mode is the MODE 1.

When the present travel mode is not the MODE 1 (NO in S520), the ECU 300 selects in S530 the normal travel mode that has no restriction. When the present travel mode is the MODE 1 (YES in S520), the process is forwarded to S540, and the ECU 300 determines whether the cooling water temperature TWH is lower than the threshold value H1$u$, and switches (S530) from the MODE 1 to the normal travel mode when the cooling water temperature TWH is lower than the threshold value H1$u$ (YES in S540). On the other hand, when the cooling water temperature TWH is the threshold value H1$u$ or more (NO in S540), the ECU 300 maintains the MODE 1 in S550 and the cooling fan 420 and/or the electric pump 450 in a high drive state.

When the cooling water temperature TWH is higher than the threshold value H1$o$ in S510 (YES in S510), the process is forwarded to S560, and the ECU 300 next determines whether the cooling water temperature TWH is higher than the threshold value H2$o$.

When the cooling water temperature TWH is the threshold value H2$o$ or less (NO in S560), the process is forwarded to S570, and the ECU 300 determines whether the present travel mode is the MODE 2. When the present travel mode is not the MODE 2 (NO in S570), the ECU 300 selects the MODE 1 as the travel mode (S550).

When the present travel mode is the MODE 2 (YES in S570), the process is forwarded to S580, and the ECU 300 determines whether the cooling water temperature TWH is lower than the threshold value H2$u$. When the cooling water temperature TWH is lower than the threshold value H2$u$ (YES in S580), the ECU 300 switches the travel mode from the MODE 2 to the MODE 1 (S550). When the cooling water temperature TWH is the threshold value H2$u$ or more (NO in S580), the process is forwarded to S590, and the ECU 300 maintains the travel mode in the MODE 2. In the MODE 2, the ECU 300 executes an upper arm ON travel where the converter 120 is fixed to an upper arm on-state and a lower arm off-state.

When the cooling water temperature TWH is higher than the threshold value H2$o$ in S560 (YES in S560), the process is forwarded to S600, and the ECU 300 determines next whether the cooling water temperature TWH is higher than the threshold value H3$o$.

When the cooling water temperature TWH is higher than the threshold value H3$o$ (YES in S600), the process is forwarded to S630, and the ECU 300 selects the MODE 3 as the travel mode. In the MODE 3, the ECU 300 executes a travel while restricting the load rate of the motor generator 145 corresponding to the cooling water temperature TWH.

When the cooling water temperature TWH is the threshold value H3$o$ or less (NO in S600), the process is forwarded to S610, and the ECU 300 determines whether the present travel mode is the MODE 3. When the present travel mode is not the MODE 3 (NO in S610), the ECU 300 selects the MODE 2 as the travel mode (S550) (S590).

When the present travel mode is the MODE 3 (YES in S610), the process is forwarded to S620, and the ECU 300 determines whether the cooling water temperature TWH is lower than the threshold value H3$u$. The ECU 300 switches the travel mode from the MODE 3 to the MODE 2 (S590) when the cooling water temperature TWH is lower than the threshold value H3$u$ (YES in S620) and maintains the MODE 3 as the travel mode (S630) when the cooling water temperature TWH is the threshold value H3$u$ or more (NO in S620).

When the control is performed according to such processes as described above, in the case where the grille shutter closing failure where the grille shutter is left in a closed state occurs in a vehicle that includes a grille shutter in a cooler, the vehicle can continue travelling while protecting parts by preventing the drive device from becoming an overheated state.

In the first embodiment of the present invention, a configuration of a hybrid vehicle in which a travel mode is switched based on both of a temperature of the engine and a temperature of the electric driving part was described. The present invention can be applied also to a vehicle that includes only an engine as a driving source and also to a vehicle that includes only a rotary electric machine as a driving source such as an electric vehicle. Next, a second embodiment in which the present invention is applied to a vehicle that includes only an engine as the driving source will be described.

Figure 7:
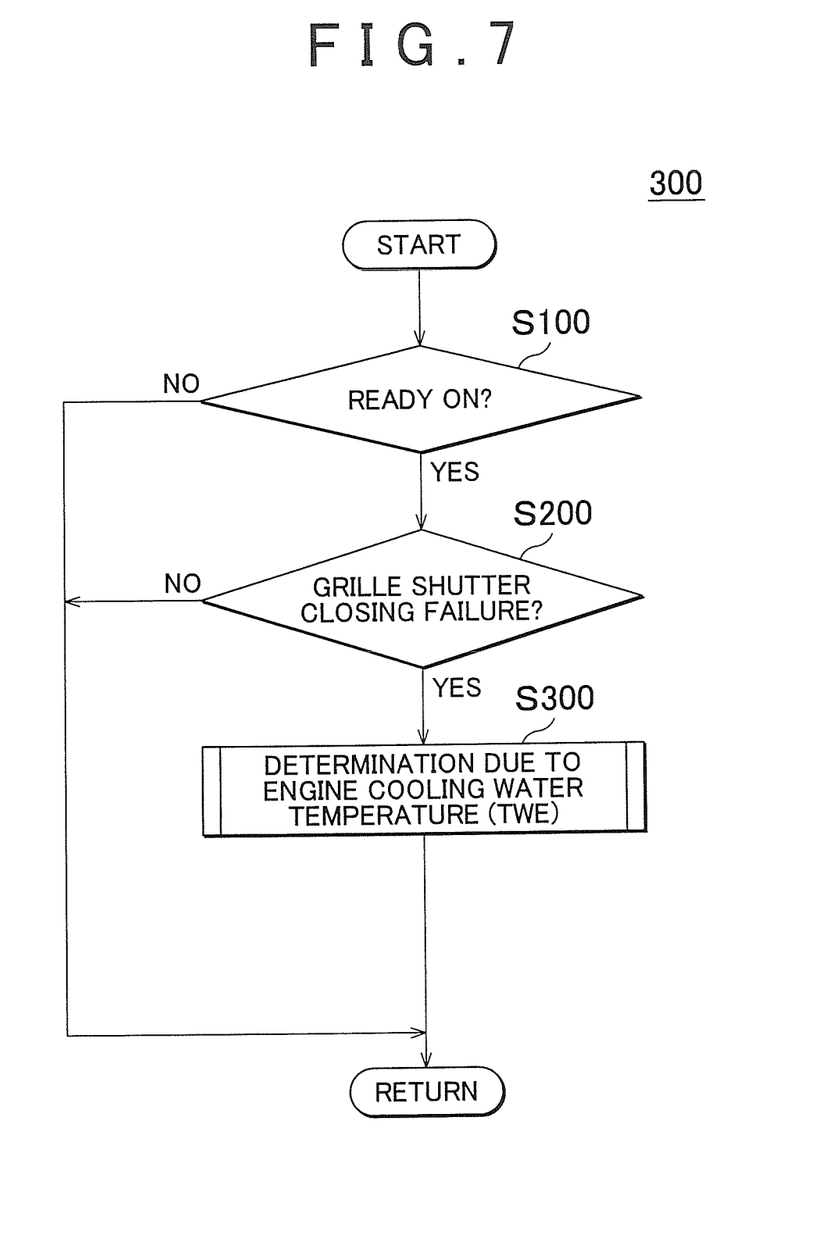
FIG. 7 is a flowchart that describes switching control of a travel mode, which is executed in the ECU in a second embodiment of the present invention.

FIG. 7 is a flowchart of a case that includes only a function of a switching control of a travel mode based on a temperature of an engine. In the flowchart of FIG. 7, a step S500 in the flowchart of FIG. 4 is deleted. Other steps in FIG. 7 are the same as those in FIG. 4 and detailed descriptions thereof are not repeated.

When a configuration such as shown in FIG. 7 is adopted, the present invention becomes applicable also to a vehicle that includes only an engine as a driving source. Further, also in a hybrid vehicle, when a grille shutter is installed only in a cooling system of an engine, for example, the control like FIG. 7 can be applied.

Figure 8:
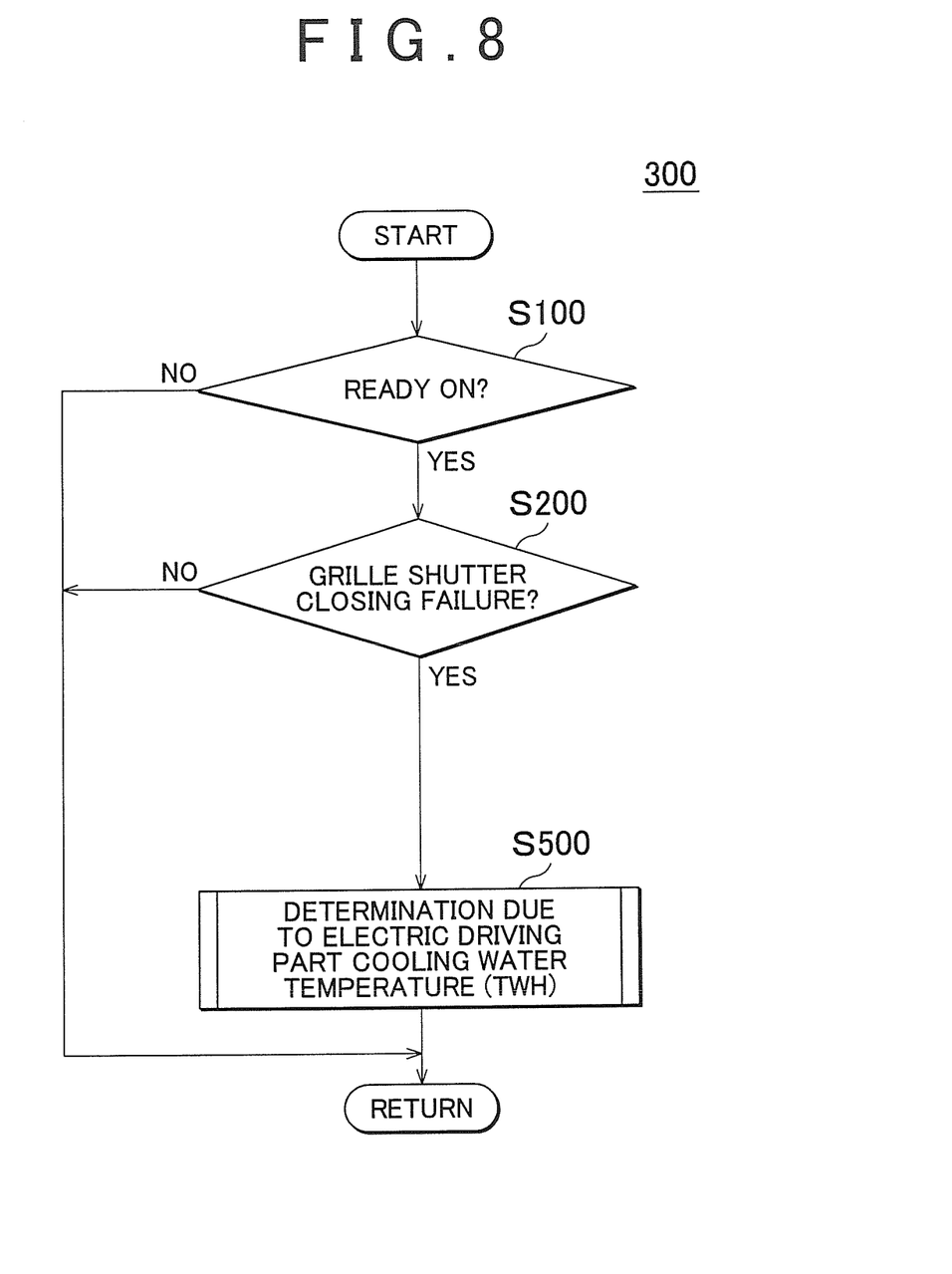
FIG. 8 is a flowchart that describes switching control of a travel mode, which is executed in the ECU in a third embodiment of the present invention.

Next, a third embodiment in which the present invention is applied to a vehicle that includes only a rotary electric machine as a driving source, an electric vehicle will be described. FIG. 8 is a flowchart of a case in which only a function of switching control of a travel mode based on a temperature of an electric driving part is included. In the flowchart of FIG. 8, a step S300 in the flowchart of FIG. 4 is deleted. Since other steps in FIG. 8 are the same as those in FIG. 4, detailed descriptions thereof are not repeated.

When a configuration such as shown in FIG. 8 is adopted, the present invention becomes applicable also to an electric vehicle that includes only a rotary electric machine as a driving source. Further, also in a hybrid vehicle, in a vehicle that uses mainly a driving force due to the electric driving part, for example, the present configuration can be applied.

It should be considered that embodiments disclosed this time are only illustrative and not restrictive in all respects. The range of the present invention is shown not by the description described above but ranges of patent claims, and it is intended to include all modifications in the meaning and range equivalent with the ranges of patent claims.

What is claimed is:

1. A vehicle comprising:
   an energy storage device
   a driving source configured to generate a driving force, the driving source includes a rotary electric machine and a power converter that drives the rotary electric machine with an electric power from the energy storage device;

a shutter device configured to adjust an amount of air for cooling the driving source; and a controller configured to control the driving source, the controller being configured to restrict an operation of the rotary electric machine based on a temperature of at least one of the rotary electric machine and the power converter when a failure of the shutter device is detected.

2. The vehicle according to claim 1, wherein:
the shutter device is disposed in a front grille of the vehicle, the shutter device is configured to adjust an amount of air passing through the front grille by adjusting an opening of the shutter; and
the controller is configured to restrict the operation of the driving source when a failure in which the opening of the shutter remains in a more closed state than a specified opening amount is detected.

3. The vehicle according to claim 1, wherein:
the driving source includes an internal combustion engine; and
the controller is configured to restrict the operation of the driving source based on a temperature of the internal combustion engine.

4. The vehicle according to claim 3 wherein the controller is configured to restrict at least one of a rotation speed and an output torque of the internal combustion engine when a failure of the shutter device is detected and a temperature of the internal combustion engine exceeds a specified reference temperature.

5. The vehicle according to claim 3 wherein the controller is configured to stop the internal combustion engine when a failure of the shutter device is detected and a temperature of the internal combustion engine exceeds a specified reference temperature.

6. The vehicle according to claim 1 wherein:
the power converter includes a converter that steps up an output voltage of the energy storage device; and
the controller is configured to restrict an operation of stepping up a voltage of the converter when a failure of the shutter device is detected and a temperature of at least one of the rotary electric machine and the power converter exceeds a specified reference temperature that is determined in advance corresponding to each of the rotary electric machine and the power converter.

7. The vehicle according to claim 1 wherein the controller is configured to control the power converter such that a load rate of the rotary electric machine is limited when a failure of the shutter device is detected and a temperature of at least one of the rotary electric machine and the power converter exceeds a specified reference temperature that is determined in advance corresponding to each of the rotary electric machine and the power converter.

8. The vehicle according to claim 1 further comprising:
a cooling fan configured to cool a cooling medium by blowing air passed through the shutter device; and
a pump configured to deliver the cooled cooling medium to the driving source to cool the driving source, wherein
the controller is configured to control such that at least one of an air amount of the cooling fan and a discharge amount of the pump is increased when the failure of the shutter device is detected and a temperature of the cooling medium equal to or exceeds a specified reference temperature than when the failure of the shutter device is detected and the temperature of the cooling medium lower than the specified reference temperature.

9. A vehicle comprising:
an internal combustion engine;
a cooler configured to cool the internal combustion engine with a cooling medium;
a shutter device configured to adjust an amount of air for cooling the internal combustion engine;
a cooling fan configured to blow air passed through the shutter device to cool the cooling medium;
a pump configured to deliver the cooling medium to the internal combustion engine; and
a controller configured to select a first travel mode when a failure of the shutter device is detected and a temperature of the cooling medium is lower than a first reference temperature, the controller configured to select a second travel mode when the failure of the shutter device is detected and the temperature of the cooling medium exceeds the first reference temperature, the controller configured to control the cooler such that in the first travel mode, at least one of an amount of air of the cooling fan and a discharge amount of the pump is increased more than the normal travel mode, the controller configured to select a second travel mode when the failure of the shutter device is detected and the temperature of the cooling medium exceeds a second reference temperature that is higher than the first reference temperature, the controller configured to restrict at least one of a rotation speed and an output torque of the internal combustion engine in the second travel mode as compared with the normal travel mode, the controller configured to select a third drive mode when the failure of the shutter device is detected and the temperature of the cooling medium exceeds a third reference temperature that is higher than the second reference temperature, the controller configured to stop the internal combustion engine in the third drive mode.

10. The vehicle according to claim 9 wherein:
the controller is configured to switch the drive mode from the first travel mode to the normal travel mode when the temperature of the cooling medium falls below a fourth reference temperature that is lower than the first reference temperature during the selection of the first travel mode, the controller is configured to switch the drive mode from the second travel mode to the first travel mode when the temperature of the cooling medium falls below a fifth reference temperature during the selection of the second travel mode, the fifth reference temperature is between the first reference temperature and the second reference temperature, the controller is configured to switch the drive mode from the third drive mode to the second travel mode when the temperature of the cooling medium falls below a sixth reference temperature during the selection of the third drive mode, the sixth reference temperature is between the second reference temperature and the third reference temperature.

11. A vehicle comprising:
an energy storage device;
a rotary electric machine;
a drive device including a power converter that drives the rotary electric machine using electric power from the energy storage device, the power converter including a chopper circuit having upper and lower arms of a switching element and a converter that steps up an output voltage of the energy storage device;
a cooler configured to cool the drive device with a cooling medium;
a shutter device configured to adjust an amount of air for cooling the drive device;

a cooling fan configured to cool the cooling medium by blowing air passed through the shutter device;

a pump configured to deliver the cooling medium to the drive device;

a controller configured to select a normal travel mode when a failure of the shutter device is detected and a temperature of the cooling medium is lower than a first reference temperature, the controller configured to select a first travel mode when the failure of the shutter device is detected and the temperature of the cooling medium exceeds the first reference temperature, the controller configured to control the cooler such that in the first travel mode, at least one of an amount of air of the cooling fan and a discharge amount of the pump is increased compared with the normal travel mode, the controller configured to select a second travel mode when the failure of the shutter device is detected and the temperature of the cooling medium exceeds a second reference temperature that is higher than the first reference temperature, the controller configured to hold the upper arms of the switching element in a conduction state in the second travel mode, the controller configured to select a third drive mode when the failure of the shutter device is detected and the temperature of the cooling medium exceeds a third reference temperature that is higher than the second reference temperature, the controller configured to control the power converter such that a load rate of the rotary electric machine is restricted by comparing with the normal travel mode in the third drive mode.

12. The vehicle according to claim 11 wherein the controller is configured to switch the drive mode from the first travel mode to the normal travel mode when the temperature of the cooling medium falls below a fourth reference temperature during the selection of the first travel mode, the fourth reference temperature is lower than the first reference temperature, the controller is configured to switch the drive mode from the second travel mode to the first travel mode when the temperature of the cooling medium falls below a fifth reference temperature during the selection of the second travel mode, the fifth temperature is between the first reference temperature and the second reference temperature, the controller is configured to switch the drive mode from the third drive mode to the second travel mode when the temperature of the cooling medium falls below a sixth reference temperature during the selection of the third drive mode, the sixth reference temperature is between the second reference temperature and the third reference temperature.

* * * * *

UNITED STATES PATENT AND TRADEMARK OFFICE
CERTIFICATE OF CORRECTION

PATENT NO. : 9,174,629 B2  Page 1 of 1
APPLICATION NO. : 14/231922
DATED : November 3, 2015
INVENTOR(S) : Takayuki Asami and Masashi Yoshimi It is certified that error appears in the above-identified patent and that said Letters Patent is hereby corrected as shown below:

In Specification

In Column 12, Line 65, before "(S390)", delete "(S350)"
In Column 14, Line 02, before "(S590)", delete "(S550)"

Signed and Sealed this
Twenty-ninth Day of March, 2016

Michelle K. Lee
*Director of the United States Patent and Trademark Office*